(12) United States Patent
Chen et al.

(10) Patent No.: US 11,099,861 B2
(45) Date of Patent: Aug. 24, 2021

(54) METHOD FOR PRELOADING APPLICATION, STORAGE MEDIUM, AND TERMINAL

(71) Applicant: Guangdong Oppo Mobile Telecommunications Corp., Ltd., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 198 days.

(21) Appl. No.: 16/394,768

(22) Filed: Apr. 25, 2019

(65) Prior Publication Data
US 2019/0370021 A1 Dec. 5, 2019

(30) Foreign Application Priority Data
May 29, 2018 (CN) .......................... 201810531573.5

(51) Int. Cl.
*G06F 9/445* (2018.01)
*G06F 9/4401* (2018.01)
*G06F 9/48* (2006.01)

(52) U.S. Cl.
CPC ........ *G06F 9/44578* (2013.01); *G06F 9/4401* (2013.01); *G06F 9/4875* (2013.01)

(58) Field of Classification Search
CPC ... G06F 9/44578; G06F 9/4401; G06F 9/4875
See application file for complete search history.

(56) References Cited

U.S. PATENT DOCUMENTS

| 8,812,658 B1* | 8/2014 | Teeraparpwong .... G06F 16/958 709/224 |
| 9,565,233 B1* | 2/2017 | Ozuysal ................ H04L 67/306 |
| 10,459,887 B1* | 10/2019 | Dvortsov .............. G06F 3/0485 |

(Continued)

FOREIGN PATENT DOCUMENTS

| CN | 103631612 A | 3/2014 |
| CN | 103677922 A | 3/2014 |

(Continued)

OTHER PUBLICATIONS

International search report issued in corresponding international application No. PCT/CN2019/083479 dated Jun. 27, 2019.

(Continued)

*Primary Examiner* — Aurel Prifti
(74) *Attorney, Agent, or Firm* — Young Basile Hanlon & MacFarlane, P.C.

(57) ABSTRACT

A method for preloading an application, a storage medium, and a terminal are provided. The method includes the following. An application to be preloaded is determined in response to detecting that an event of application preloading is triggered. When a new application installed within a time-window exists, whether the new application belongs to the application to be preloaded is determined. The new application and the application to be preloaded are preloaded based on a determination that the new application does not belong to the application to be preloaded.

20 Claims, 7 Drawing Sheets

(56) References Cited

U.S. PATENT DOCUMENTS

| | | | | |
|---|---|---|---|---|
| 2005/0204198 | A1* | 9/2005 | Pagan | G06F 9/445 714/36 |
| 2008/0005736 | A1* | 1/2008 | Apacible | G06F 9/4843 718/100 |
| 2011/0292060 | A1* | 12/2011 | Chambers | G06F 3/0482 345/545 |
| 2012/0023226 | A1* | 1/2012 | Petersen | H04L 65/608 709/224 |
| 2012/0324481 | A1* | 12/2012 | Xia | G06F 9/485 719/320 |
| 2013/0067394 | A1* | 3/2013 | Nan | G06F 3/0481 715/784 |
| 2013/0120294 | A1* | 5/2013 | Sun | G06F 9/451 345/173 |
| 2013/0173513 | A1* | 7/2013 | Chu | G06F 9/451 706/14 |
| 2014/0372356 | A1* | 12/2014 | Bilal | G06F 9/44578 706/46 |
| 2015/0293701 | A1* | 10/2015 | Kim | G06F 3/0671 710/5 |
| 2015/0324137 | A1* | 11/2015 | Wu | G06F 3/0619 713/2 |
| 2016/0070421 | A1* | 3/2016 | Zhang | G06F 3/1423 715/803 |
| 2016/0132344 | A1* | 5/2016 | Funk | G06F 9/541 719/328 |
| 2016/0189049 | A1* | 6/2016 | Silvestri | H04W 4/20 706/52 |
| 2016/0357572 | A1* | 12/2016 | Myrick | G06F 11/1438 |
| 2016/0364272 | A1* | 12/2016 | Hou | G06F 9/5038 |
| 2017/0031690 | A1* | 2/2017 | Ren | G06F 9/445 |
| 2017/0046171 | A1* | 2/2017 | Jung | G06F 9/4405 |
| 2017/0185250 | A1* | 6/2017 | Cho | G06F 3/0482 |
| 2017/0195451 | A1* | 7/2017 | Backholm | H04L 67/2852 |
| 2017/0330248 | A1* | 11/2017 | Gomariz | G06Q 30/0272 |
| 2018/0077243 | A1* | 3/2018 | Mathew | H04L 67/143 |
| 2018/0089105 | A1* | 3/2018 | Bain | G06F 12/109 |
| 2018/0217853 | A1* | 8/2018 | Li | G06F 9/48 |
| 2018/0293087 | A1* | 10/2018 | Lee | G06F 3/0482 |
| 2019/0146625 | A1* | 5/2019 | Zhu | G06F 9/451 345/173 |
| 2019/0258372 | A1* | 8/2019 | Wang | G06F 9/451 |
| 2019/0303176 | A1* | 10/2019 | John | G06N 5/046 |
| 2019/0342298 | A1* | 11/2019 | Chen | H04L 9/32 |

FOREIGN PATENT DOCUMENTS

| | | | | |
|---|---|---|---|---|
| CN | 105786839 | A | 7/2016 | |
| CN | 106201241 | A | 12/2016 | |
| CN | 106201448 | A | 12/2016 | |
| CN | 106325913 | A | 1/2017 | |
| CN | 106406966 | A | 2/2017 | |
| CN | 106648733 | A | 5/2017 | |
| CN | 107229397 | A | 10/2017 | |
| CN | 107748686 | A | 3/2018 | |
| CN | 107783801 | A | 3/2018 | |
| CN | 107833073 | A | 3/2018 | |
| EP | 1242880 | A2 | 9/2002 | |
| EP | 3486769 | A1 * | 5/2019 | G06F 9/445 |

OTHER PUBLICATIONS

European Search Report issued in corresponding European Application No. 19173778.2 dated Oct. 11, 2019.
Tingxin Yan et al: "Fast app launching for mobile devices using predictive user context", MOBISYS 2012: 10th International Conference on Mobile Systems, Applications ANO Services, Jun. 25, 2012 (Jun. 25, 2012), pp. 113-126, XP055106616, DOI: 10.1145/2307636.2307648 ISBN: 978-1-45-031301-8.
Cao Hong et al: "Mining smartphone data for app usage prediction and recommendations: A survey", Pervasive and Mobile Computing, Elsevier, NL, vol. 37, Jan. 20, 2017 (Jan. 20, 2017), pp. 1-22, XP029961029, ISSN: 1574-1192, DOI: 10.1016/J.PMCJ.2017.01.007.
First Office Action and Translation issued in corresponding CN application No. 201810531573.5 dated Oct. 29, 2020.
Google: "Multi-Window Support—Android Developers", May 19, 2018 (May 19, 2018), XP055659703, Retrieved from Internet: URL: https://web.archive.org/web/20180519111727/https://developer.android. com/guide/topics/ui/multi-window [retrieved on Jan. 20, 2020]; the whole document.
Extended European search report issued in corresponding European application No. 19173778.2 dated Jan. 29, 2020.
First Examination Report issued in corresponding in application No. 201914018510 dated Jan. 27, 2021.
The fourth office action with English Translation issued in corresponding CN application No. 201711340000.6 dated Jun. 3, 2021.
Chinese Second Office Action with English Translation for CN Application 201810531573.5 dated Jun. 24, 2021. (14 pages).
Communication pursuant to Article 94(3) EPC for EP Application 19173778.2 dated Jul. 1, 2021. (8 pages).

* cited by examiner

METHOD FOR PRELOADING APPLICATION, STORAGE MEDIUM, AND TERMINAL

CROSS-REFERENCE TO RELATED APPLICATIONS

This application claims priority to Chinese Patent Application No. 201810531573.5, filed on May 29, 2018, the disclosure of which is hereby incorporated by reference in its entirety.

TECHNICAL FIELD

The present disclosure relates to the technical field of preloading an application, and more particularly to a method for preloading an application, a storage medium, and a terminal.

BACKGROUND

At present, terminals such as smart phones, tablets, notebook computers, and smart household appliances have become indispensable electronic devices in people's daily life. As terminal devices are increasingly more intelligent, most terminal devices are loaded with operating systems which enable the terminal devices to install a variety of applications to meet different user's needs.

With the improvement of the configuration of terminal devices, dozens or even hundreds of applications can be installed in most terminal devices. As the functions of the applications become increasingly diversified, an increasing number of resources need to be loaded when the applications are running. When a user chooses to launch an application, the terminal will load the resources required for the application to be launched. After the loading is completed, the terminal enters an initial interface of the application. The whole process usually takes several seconds or even more than ten seconds, which results in low launching efficiency and thus needs to be improved.

SUMMARY

The present disclosure provides a method for preloading an application, a storage medium, and a terminal.

In a first aspect, a method for preloading an application in a terminal is provided. The method includes determining an application to be preloaded in response to detecting that an event of application preloading is triggered, determining whether a new application belongs to the application to be preloaded when the new application exists, and preloading the new application and the application to be preloaded in response to determining that the new application does not belong to the application to be preloaded. The new application is installed within a time-window with a preset length and backtracked with a current moment as a starting moment.

In a second aspect, a computer-readable storage medium is provided according to the present disclosure. The computer-readable storage medium is configured to store computer programs which, when executed by a processor, are operable with the processor to execute the method for preloading an application in the first aspect of the present disclosure.

In a third aspect, a terminal is provided according to the present disclosure. The terminal includes at least one processor and a computer readable storage, coupled to the at least one processor and storing at least one computer executable instruction thereon which, when executed by the at least one processor, cause the at least one processor to execute the method for preloading an application in the first aspect of the present disclosure when executed by the processor.

DETAILED DESCRIPTION

Technical solutions of the present disclosure will be further described below through embodiments with reference to the accompanying drawings. It will be appreciated that the embodiments described herein are merely for the purpose of explanation rather than restriction of the disclosure. In addition, for the convenience of description, only some structures related to the present disclosure, rather than all structures, are illustrated in the accompanying drawings.

Before discussing the exemplary embodiments in more detail, it should be noted that some exemplary embodiments are described as processes or methods illustrated in a flowchart. In the flowchart, although each step is depicted as being processed sequentially, some of these steps can be performed in parallel, concurrently, or simultaneously. In addition, the order of the steps can be rearranged. The process of one step can be terminated when a corresponding operation is completed, but the embodiments can also have additional steps that are not illustrated in the accompanying drawings. The process can correspond to a method, a function, a procedure, a subroutine, a subprogram, and the like.

Figure 1:
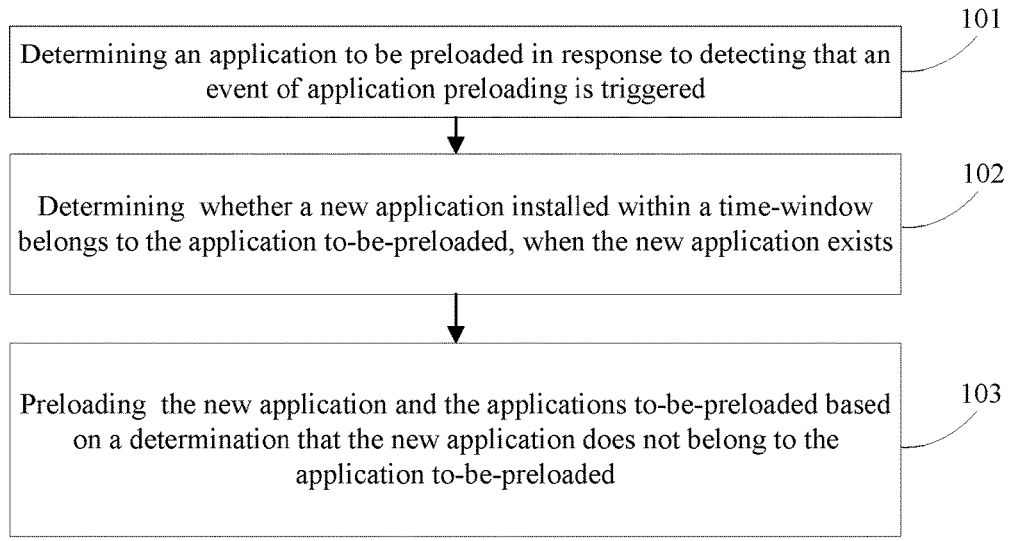
FIG. 1 is a flowchart illustrating a method for preloading an application according to an aspect of the present disclosure.

FIG. 1 is a flowchart illustrating a method for preloading an application according to an aspect of the present disclosure. The method can be implemented by an apparatus for preloading an application. The apparatus can be implemented by software and/or hardware and can be generally integrated into a terminal. As illustrated in FIG. 1, the method includes the following.

At 101, an application to be preloaded is determined in response to detecting that an event of application preloading is triggered.

As an embodiment, the application to be preloaded can include one or more applications.

As an embodiment, the terminal provided herein can include a terminal device such as a mobile phone, a tablet computer, a notebook computer, a smart household appliance, and the like. The terminal is loaded with an operating system.

As an embodiment, a trigger condition of the event of application preloading can be set according to practical situations, which is not limited herein. As an embodiment, the event of application preloading can be triggered in response to detecting that a user operation satisfies a predetermined condition (such as taking up the terminal, inputting to unlock a screen or the terminal, and the like). As another embodiment, the event of application preloading can be triggered in response to detecting a change of a foreground application. For yet another embodiment, the event of application preloading can be triggered immediately (or after a preset duration) after a predicting process of the application preloaded is completed. As an embodiment, the event of application preloading can be triggered periodically. When the event of application preloading is triggered, the operating system can detect that the event of application preloading is triggered by reading a flag, receiving a trigger instruction, or the like. The manner of detection is not limited herein.

As an embodiment, an application to be preloaded can be understood as an application that may be launched soon by a user, a fixed application predetermined, an application that is predicted in a certain manner, or the like. There can be one or more applications to be preloaded.

As an embodiment, the application to be preloaded can be predicted by adopting a prediction model. The prediction model can be a machine-learning model. An algorithm adopted can include recurrent neural networks (RNN), long short-term memory (LSTM) networks, gated recurrent unit (GRU), simple recurrent unit (SRU), auto encoder, decision tree, random forest, feature mean classification, classification and regression tree, hidden Markov model, K-nearest neighbor (KNN) algorithm, logistic regression model, Bayesian model, Gaussian model, Kullback-Leibler (KL) divergence, and the like.

As an embodiment, training samples can be collected during use of the terminal, a predetermined initial model can be trained by using the training samples, and finally the prediction model for predicting the application to be preloaded is obtained. As an embodiment, elements contained in the training samples can include a time sequence or an order in which applications are launched and include time, locations, frequencies, and the like at which applications are launched. The elements can include running status of the terminal, such as an on/off state of a mobile data network, a connected/disconnected state of a wireless hotspot, identity information of a connected wireless hotspot, an application currently running, a previous foreground application, a duration for which a current application stays in the background, a time point at which the current application was last switched to the background, a plugging/unplugging state of an earphone jack, a charging state, power information of a battery, a display duration of a screen, and the like. The elements can also include data collected by a sensor integrated in the terminal, such as a motion sensor, a light sensor, a temperature sensor, a humidity sensor, and the like.

As an embodiment, proper sample elements can be selected according to the machine-learning model selected. As another embodiment, the machine-learning model also can be determined according to the selected sample elements. As yet another embodiment, the machine-learning model and the sample elements can be selected according to requirements for prediction accuracy and prediction speed, which is not limited herein.

In the embodiments of the present disclosure, the application to be preloaded can be determined according to a previous output result of the prediction model. As another embodiment, by adopting the prediction model for prediction, the application to be preloaded can be determined according to a current output result of the prediction model.

In the embodiments of the present disclosure, when there are multiple (that is, N) applications to be preloaded, the prediction model can output launching probabilities of each of a set of candidate applications, and candidate applications with higher launching probabilities are determined as the applications to be preloaded. As an embodiment, the applications to be preloaded can be determined as follows. Launching probabilities of candidate applications are predicted. A preset number of candidate applications with higher startup probabilities are determined as the applications to be preloaded. As an embodiment, the candidate applications can include all or part of applications installed in the terminal. The part of applications may not include system applications, and may not include applications that are rarely used. The determining manner and the quantity of the candidate applications are not limited in the embodiments of the present disclosure. As an embodiment, the candidate applications can be determined according to the frequency (the number of times) of use and/or duration of use of each application within a preset time period before current moment. The preset time period can be, for example, one month. When the frequency of use and/or the duration of use of an application exceed a corresponding threshold, the application is determined as a candidate application. As another embodiment, all applications are sorted in a descending order of the frequency of use and/or the duration of use, and top-ranked applications are determined as candidate applications.

As an embodiment, the launching probability of each candidate application can be determined by the above-mentioned prediction model. Current samples are collected according the training samples used for training the prediction model, and the current samples are input into the prediction model to obtain the launching probability of each candidate application. All the candidate applications are sorted in a descending order of launching probabilities, and N (N is a preset number) top-ranked candidate applications are determined as the applications to be preloaded. In this way, multiple applications can be preloaded, and the multiple applications are determined based on the launching probabilities, which can improve accuracy of prediction.

At 102, when a new application, installed within a time-window which has a preset length and is backtracked with a current moment as a starting moment, exists, whether the new application belongs to the application to be preloaded is determined.

In the embodiments of the present disclosure, during use of the terminal, the user can install a new application as needed. Generally, the user may frequently use the new application for a time period. The applications to-be preloaded determined by operations at 101 usually do not or rarely include the new application, especially during the time period, which is not long, from when the new application is installed. The new application is launched slowly usually because the new application is not preloaded. Therefore, after detecting that the event of application preloading is triggered and determining the application to be preloaded, whether the terminal has the new application that is installed within the time-window which has the preset length and is backtracked with the current moment as the starting moment is determined. If so, whether the new application belongs to the application to be preloaded is further determined, so as to facilitate subsequent determination of applications that actually needs to be preloaded according to the determination result.

In the embodiments of the present disclosure, the current moment can be understood as the moment when the event of application preloading is triggered, and can also be understood as the moment when the application to be preloaded is determined. The time-window which has the preset length and is backtracked with the current moment as the starting moment can be understood as a preset time period which is backtracked from the current moment. Exemplarily, the current moment is 12:00, that is, the event of application preloading is triggered at 12:00 or the application to be preloaded is determined at 12:00. When the preset length of the time-window is set to 30 minutes, determine whether the new application installed within a time period from 11:30 to 12:00 exists, that is, determine whether the new application is installed within the time period from 11:30 to 12:00. For example, if Application A is installed at 11:45, determine that the new application (Application A) installed within the time period from 11:30 to 12:00 exists. For another example, if Application B is installed at 11:35 and Application C is installed at 11:50, determine that new applications (Application B and Application C) installed within the time period from 11:30 to 12:00 exist. The number of new applications and the preset length of the time-window are not limited herein, and the preset length of the time-window can be 30 minutes, one hour, one day, or the like.

As an embodiment, when the new application installed within the time-window which has the preset length and is backtracked with the current moment as the starting moment exists, whether the new application belongs to the application to be preloaded is further determined, that is, whether the application to be preloaded includes the new application is determined. For instance, if the applications to-be preloaded determined by operations at 101 include Application A, Application B, Application C, and Application D, determine whether the new application is Application A, Application B, Application C, or Application D. When the new application is determined to be Application D, the new application belongs to the application to be preloaded. When the new application is determined to be Application E, the new application does not belong to the application to be preloaded.

At 103, the new application and the application to be preloaded are preloaded based on a determination that the new application does not belong to the application to be preloaded.

In the embodiments of the present disclosure, when the new application does not belong to the application to be preloaded, the new application is also preloaded with the application to be preloaded in order to increase the launching speed of the new application. In other words, the new application and the application to be preloaded determined by operations at 101 are determined as final applications to be preloaded, and are preloaded. As an embodiment, the new application and the application to be preloaded can be preloaded at the same time, that is, the preloading process of the new application and the preloading processes of the application to be preloaded can be performed in parallel. As another embodiment, the application to be preloaded can be preloaded after or before the new application. The order of preloading the new application and the application to be preloaded is not limited in the embodiments of the present disclosure.

The preloading process and the resources to-be-loaded are not limited herein, and the preloading of the application to be preloaded is described as an example. As an embodiment, corresponding hardware resources can be allocated to the application to be preloaded, and related data required for launching can be loaded based on the allocated hardware resources. As an embodiment, application process launching, application service launching, memory allocation, file content reading, network data acquisition, interface rendering, and the like can be included. In addition, the resources to be preloaded can be determined according to specific types of the applications to be preloaded. As an embodiment, when an application to-be-preload is social software, a launching screen, a contact list, and recent message records of the application to-be-preload can be preloaded; when the application to-be-preload is a game, data related to a game background and the like of the application to-be-preload can be preloaded.

As an embodiment, when it is determined that the new application installed within the time-window which has the preset length and is backtracked with the current moment as the starting moment does not exist, only the applications to-be preloaded determined by operations at 101 are preloaded.

According to a solution for preloading an application provided herein, the application to be preloaded is determined in response to detecting that the event of application preloading is triggered. When a new application installed within the time-window which has the preset length and is backtracked with the current moment as the starting moment exists, whether the new application belongs to the application to be preloaded is determined. The new application and the application to be preloaded are preloaded based on the determination that the new application does not belong to the application to be preloaded. By adopting the technical solution described above, the new application and the application to be preloaded are preloaded, which can improve the hit rate of preloading an application that the user actually launches, thereby increasing not only the launching speed of the application to be preloaded, but also the launching speed of the new application.

In some embodiments, the new application and the application to be preloaded are preloaded as follows based on the determination that the new application does not belong to the application to be preloaded. A type of the new application is determined based on the determination that the new application does not belong to the application to be preloaded. When the application to be preloaded has a target application of the same type as the new application, the new application and the application to be preloaded are preloaded. In other words, the method further includes the following. The type of the new application is acquired. It is judged that the application to be preloaded has the target application of the same type as the new application. As an embodiment, the target application of the same type as the new application can be implemented as a first target application. As such, whether to preload the new application can be reasonably determined based on the determination result of whether the application to be preloaded has the first target application of the same type as the new application, which can better satisfy user's needs.

Although sometimes the application to be preloaded determined does not include the new application, it may be predicted that the user currently does not really need to use the new application. If the new application does not belong to the application to be preloaded, preloading directly the new application can occupy a large amount of memory, waste system resources, and affect smoothness of the application running in the foreground. In particular, applications such as games and videos, whose launching resources occupy a larger amount of memory space, can be set according to practical situations. Therefore, the new application can be preloaded when the application to be preloaded has the first target application of the same type as the new application.

The classification rule of types is not limited herein. As an embodiment, applications can be classified according to an association relationship with other applications (for example, Application A and Application B are applications that are strongly associated with shopping applications, and then Application A and Application B can be regarded as payment applications). As another embodiment, the applications can be classified according to default categories in an app store (such as social, office, games, photography and video, education, etc.). When the application to be preloaded has the first target application of the same type as the new application, it indicates that the new application is also more likely to be launched. Considering improving the hit rate of preloading the application that the user actually launches, the new application and the application to be preloaded can be preloaded at this time.

As an embodiment, the application to be preloaded includes Application A, Application B, Application C, Application D, and Application E, and new application include Application F. The new application (Application F) belongs to the shopping applications, and Application B in the application to be preloaded also belongs to the shopping applications, that is, the application to be preloaded has the first target application (Application B) of the same type as the new application (Application F). It can be predicted that shopping applications such as Application B and Application F are more likely to be launched, and thus the new application (Application F) is also preloaded. That is to say, Application A, Application B, Application F, Application C, Application D, and Application E are preloaded.

As an embodiment, when the application to be preloaded has the first target application of the same type as the new application, determine whether the launching probability corresponding to the first target application is greater than a preset probability threshold. If so, the new application and the application to be preloaded are preloaded; otherwise, only the application to be preloaded is preloaded. When the launching probability corresponding to the first target application is low, for example, the launching probability corresponding to the first target application is lowest in the application to be preloaded, it indicates that the first target application is less likely to be launched, and it can further indicate that the new application is less likely to be launched. The new application may not be preloaded for the purpose of saving memory space. However, when the launching probability corresponding to the first target application is high, for example, the launching probability corresponding to the first target application is highest in the application to be preloaded, it indicates that the first target application is more likely to be launched, and it can further indicate that the new application is more likely to be launched. The new application can be preloaded for the purpose of increasing the launching speed of the new application. In this way, the new application is preloaded when the first target application of the same type as the new application has a higher startup probability, thereby comprehensively taking two factors, that is, saving memory space and increasing the launching speed of the new application, into consideration.

As an embodiment, the new application and the application to be preloaded can be preloaded as follows based on the determination when the application to be preloaded has the first target application of the same type as the new application. When the application to be preloaded have the first target application of the same type as the new application, the new application and the application to be preloaded are preloaded in a descending order of launching probabilities of the new application and the application to be preloaded, where a launching probability of the new application is the same as that of the first target application. In other words, the method further includes the following. The new application and the application to be preloaded are ordered in a descending order of launching probabilities of the new application and the application to be preloaded, a launching probability of the new application being the same as that of the target application. As such, when an application has a launching probability, it indicates that the application is more likely to be selected to be launched. In order to increase the launching speed of the application to be preloaded and the new application with higher launching probabilities when selected by the user to be actually launched, the application to be preloaded and the new application with higher launching probabilities are preloaded preferentially and the preloading completion degree is guaranteed as much as possible. As an embodiment, an application to be preloaded with the highest launching probability can be preloaded first, and after the application to be preloaded with the highest launching probability is preloaded, a next application to be preloaded is preloaded; or the application to be preloaded with the highest launching probability can be preloaded first, and when preloading of the application to be preloaded with the highest launching probability is about to be completed, the next application to be preloaded is started to be preloaded. In addition, sequential preloading can provide more support for an application which is currently being preloaded, such as allocating more hardware resources, increasing preloading speed, and avoiding defects such as stutters caused by parallel preloading, to ensure the foreground application runs normally. In addition, the new application and the first target application can be preloaded at the same time or in sequence by considering the launching probability corresponding to the new application to be the same as that corresponding to the first target application. The preloading order of the new application in all application to be preloaded can be reasonably determined, which better satisfies user's needs.

As an embodiment, the new application and the application to be preloaded are preloaded as follows based on the determination that the new application does not belong to the application to be preloaded. When the new application does not belong to the application to be preloaded, the frequency of use of the new application within the time-window which has the preset length and is backtracked with the current moment as the starting moment is acquired. The new application and the application to be preloaded are preloaded when the frequency of use is greater than a preset threshold. In other words, the method further includes the following. The frequency of use of the new application within the time-window is acquired. It is judged that the frequency of use is greater than a preset threshold. In this way, whether to preload the new application can be reasonably determined according to the frequency of use of the new application, which can avoid preloading the new application even if the new application is not frequently used.

In the embodiments of the present disclosure, when the new application does not belong to the application to be preloaded, the frequency of use of the new application within the time-window which has the preset length and is backtracked with the current moment as the starting moment is acquired, and whether to preload the new application is reasonably determined according to the frequency of use of the new application. As an embodiment, when the frequency of use is greater than the preset threshold, the new application and the application to be preloaded are preloaded. When the frequency of use is less than or equal to the preset threshold, only the application to be preloaded are preloaded. For example, the new application includes Application A and Application B, the preset length of the time-window is two days, the numbers of times of use of Application A and Application B within the time-window which has the preset length of two days and is backtracked with the current moment as the starting moment are respectively acquired. For example, the frequency of use of Application A is ten times and the frequency of use of Application B is three times. If the preset threshold is five times, the frequency of use of Application A is greater than the preset threshold, which indicates that the new application (Application A) is used frequently, and Application A and the application to be preloaded are preloaded. The frequency of use of Application B is less than the preset threshold, which indicates that the new application (Application B) is used less frequently, and Application B does not need to be preloaded, whereas only the application to be preloaded is preloaded.

In some embodiments, when the new application does not belong to the application to be preloaded, the new application and the application to be preloaded are preloaded as follows. For each of the application to be preloaded, a target application which has a predetermined association relationship with a current application to be preloaded is determined, based on the determination that the new application does not belong to the application to be preloaded. As an embodiment, the application which has the predetermined association relationship with the current application to be preloaded can be implemented as a second target application. The current application to be preloaded belongs to the application to be preloaded. When an type of the new application is the same as that of the second target application, the new application and the second target application are preloaded simultaneously with or after preloading of the current application to be preloaded. In this way, the hit rate of preloading an application that the user actually launches can be improved, and the launching speed of the application which has a predetermined association relationship with the current application to be preloaded and the new application can be further increased.

As an embodiment, when the new application does not belong to the application to be preloaded, for each of the application to be preloaded, the second target application which has the predetermined association relationship with the current application to be preloaded is determined. When the type of the new application is different from that of the second target application, only the second target application is preloaded simultaneously with or after preloading of the current application to be preloaded.

In the embodiments of the present disclosure, when there is only one application to be preloaded, the second target application which has the predetermined association relationship with the application to be preloaded is determined. When there are multiple applications to be preloaded, for each of the applications to be preloaded, the second target application which has the predetermined association relationship with the current application to be preloaded is determined. As an embodiment, the application to be preloaded includes five applications, which are Application A, Application B, Application C, Application D, and Application E respectively. The second target application which has the predetermined association relationship with each of the five applications (that is, Application A, Application B, Application C, Application D, and Application E) is determined respectively. In the one or more applications to be preloaded, it is not necessary to have a second target application which has a predetermined association relationship with each of the one or more applications to be preloaded.

As an embodiment, the predetermined association relationship between applications can be understood as an association between sequences of use of applications. The predetermined association relationship can include an association-launching-relationship. As an embodiment, an online shopping application is often associated with launching of an online payment application. Therefore, the online shopping application and the online payment application can be regarded as association-launching applications, in other words, the online payment application can be regarded as an application which has the predetermined association relationship with the online shopping application. As another embodiment, in the process of using a news reading application, users often share funny, significant, or interesting news messages with other users through a social application. Therefore, the news reading application and the social application can be regarded as association-launching applications, in other words, the social application can be regarded as an application which has the predetermined association relationship with the news reading application. The predetermined association relationship can also include a relationship of launching in a fixed order. For example, Application B is often launched after use of Application A is completed, then Application A and Application B can be regarded as applications with the relationships of launching in a fixed order, that is, Application B can be regarded as an application which has the predetermined association relationship with Application A.

For example, the second target application which has the predetermined association relationship with the current application to be preloaded can be determined based on a predetermined associated application list, an associated application prediction model, or user selection. The manner in which the second target application which has the predetermined association relationship with the current application to be preloaded is determined is not limited herein.

As an embodiment, when there are multiple applications to be preloaded, it can be determined whether the multiple applications to be preloaded include an application which has a predetermined association relationship with the current application to be preloaded. If so, the application can be regarded as the second target application which has the predetermined association relationship with the current application to be preloaded. As an embodiment, the second target application which has the predetermined association relationship with the current application to be preloaded can also belong to the multiple applications to be preloaded, that is, the multiple applications to be preloaded include a set of applications with the predetermined association relationship. As another embodiment, the second target application which has the predetermined association relationship with the current application to be preloaded does not belong to the multiple applications to be preloaded, which is not limited herein.

In the embodiments of the present disclosure, when an type of the new application is the same as that of the second target application, the new application and the second target application are preloaded simultaneously with or after preloading of the current application to be preloaded. As an embodiment, the current application to be preloaded is Application A, the second target application which has the predetermined association relationship with Application A is Application B, and the new application is Application C. Application C and Application B can be regarded as online payment applications. As Application B has the predetermined association relationship with Application A, Application C can also be regarded as having the predetermined association relationship with Application A. As such, Application C and Application B are preloaded simultaneously with or after preloading of Application A.

As an embodiment, the new application and the application to be preloaded are preloaded as follows. Application interfaces corresponding to the new application and the application to be preloaded are preloaded respectively based on a pre-established active-window stack for preloading. Boundary coordinates of the active-window stack for preloading are beyond a coordinate range of a display screen. The following is an embodiment of preloading the application to be preloaded.

In the embodiments of the present disclosure, an active-window can be understood as a separate interface that provides interaction and operation directly to the user. In different operating systems the interface can be referred to as different terms. To facilitate understanding, Android® operating system is taken as an example in the following.

In Android® system, the active-window is named "Activity". The Activity is a component responsible for interacting with the user. The Activity provides a screen (which can be understood as a screen interface rather than a physical display screen) for the user to interact with to complete a certain task. In an Android® application, an Activity is usually a separate screen on which some controls can be displayed, and the separate screen can also monitor and handle events of the user. In the management of the Activity, there are two concepts: Task (task stack) and Stack (active-window stack). The Task corresponds to an application and is configured to store the Activity. One or more Activities can be stored in one Task, and these Activities follow a principle of "first in, last out; last in, first out". However, the Stack is configured to manage the Task. In general, one Stack manages Tasks to which each Activity to be displayed on one screen belongs, and one Stack can manage one or more Tasks. The Stack also follows basic management principles of stacks. The screen described herein is not necessarily a complete and separate display screen. Taking "two screens" as an example, the two screens can be just two areas that independently display their respective contents on a complete display screen. The "two screens" can also be two separate display screens when the terminal has two or even more than two separate display screens.

In Android® system, a multi-window mode is supported, and the multi-window mode can include a split-screen mode, a picture-in-picture mode, and a free mode (that is, FreeForm). In the multi-window mode, the Stack on which the application locates can have its own size and can include a top coordinate, a bottom coordinate, a left coordinate, and a right coordinate in a coordinate system with the top left corner of the terminal screen as the origin. For example, boundaries of a rectangle are generally described by (a, b, c, d) and can be represented by coordinates of the top left corner and coordinates of the bottom right corner of the rectangle. The coordinates of the top left corner are (a, b) and the coordinates of the bottom right corner are (c, d). Such a rectangular area then corresponds to the size of the Stack. An in-application layout in the Stack is based on the size of the Stack, that is, the application interface corresponding to the Activity is displayed within the bounds of the size.

In the multi-window mode, multiple applications can be allowed to be visible (to the system and the user or to the system only). When an application is visible to the system and the user, it means that the application is displayed on the display screen and the user can see it. When an application is visible to the system only, it means that the application is only visible to the operating system and invisible to the user, and the application may be occluded by a foreground application, or displayed beyond the display screen as implemented in the embodiments of the present disclosure.

In the embodiments of the present disclosure, the application interfaces of the application to be preloaded can be preloaded beyond the display screen according to a multi-window mechanism of the operating system. With the multi-window mechanism, the size corresponding to the application can be set beyond the display screen to achieve the purpose of invisibility to the user, whereby display content of the foreground application on the display screen will not be affected.

In the multi-window mode, there can be multiple types of Stacks, such as Home Stack, APP Stack, other split-screen Stacks, and the like. The Home Stack represents a stack for display of desktop applications. The App Stack represents a stack for display of third-party applications. In the embodiments of the present disclosure, an active-window stack for preloading (that is, preloading Stack) is added to represent a stack for display of a preloaded application. The boundary coordinates of the preloading Stack are set beyond the coordinate range of the display screen, and the application to be preloaded can be displayed on the Stack. For Android® system, a new Stack dedicated to displaying preloaded applications can be established according to the multi-window mechanism of Android® system. In the embodiments of the present disclosure, the reason for which the new Stack is established is that the new preloading Stack established can have its own size and visibility, thus achieving the purpose of preloading beyond the display screen.

In the embodiments of the present disclosure, the time for establishing the preloading Stack is not limited. The preloading Stack can be set to be resident by default before the terminal is shipped, that is, the preloading Stack always exists. The preloading Stack can also be established after the terminal is turned on or unlocked. As another embodiment, the preloading Stack can be established after the event of application preloading is triggered (before the application to be preloaded is determined), and the like. As an embodiment, the application interface corresponding to the application to be preloaded is preloaded based on the pre-established active-window stack for preloading as follows. Whether the pre-established active-window stack for preloading exists is determined. When the pre-established active-window stack for preloading is absent, an active-window stack for preloading is established according to a predetermined principle. The application interface corresponding to the application to be preloaded is preloaded according to the active-window stack for preloading established. In this way, whether the preloading Stack exists is determined after the application to be preloaded is determined. If so, it is unnecessary to establish a new stack, and if not, the preloading Stack is established, so that system resources can be saved. As an embodiment, when there are multiple applications to be preloaded, that is, when multiple applications to be preloaded need to be preloaded continuously in a short time period, since the preloading stack is established before the first application to be preloaded starts to be preloaded, the preloading stack still exists before the second application to be preloaded starts to be preloaded, and it is not necessary to determine as above before the second application to be preloaded starts to be preloaded.

In the embodiments of the present disclosure, the process for preloading the application interface corresponding to the application to be preloaded based on the preloading Stack is not limited. For example, the application interface can be drawn and displayed according to a size of the preloading Stack.

In some embodiments, the application interface corresponding to the application to be preloaded is preloaded based on the pre-established active-window stack for preloading as follows. A target process corresponding to the application to be preloaded is established. A task stack corresponding to the application to be preloaded is established in the pre-established active-window stack for preloading. An active-window corresponding to the application to be preloaded is launched in the task stack according to the target process. The application interfaces corresponding to the application to be preloaded are drawn and displayed according to the active-window launched. As such, it is possible to draw and display the application interface corresponding to the application to be preloaded according to the active-window stack for preloading that is located beyond the coordinate range of the display screen, without interfering with running and display of the foreground application, so as to ensure system stability and, meanwhile, effectively increase the speed of launching the application to be preloaded. While the target process is established, an initiation procedure of the target process can be included. During execution of the foregoing operations, preloading of other resources can also be involved, such as application service launching, memory allocation, file content reading, network data acquisition, and the like. Preloading procedures of other resources are not limited in the embodiments of the present disclosure.

In some embodiments, the method further includes the following. A notification for forging a focus is sent to the application to be preloaded, and continuous drawing and updated display of the application interfaces corresponding to the application to be preloaded are maintained during a preset time period according to the notification for forging a focus. In this way, it is possible to finish drawing and display of the application interfaces with the application to be preloaded obtaining the focus and being visible to the system, and to improve completeness of preloading, without interfering with a focus of the foreground application. The focus described herein is also referred to as an input focus. A forged focus is independent from the focus of the foreground application. Generally, for the current Android® system, the focus is unique. For instance, an input operation such as touching is only effective for the focus. As to input focus information, the system end is accordant with the application end, and once the system end modifies the input focus information, information indicative of modification of the input focus information will be sent to the application end, so as to keep the input focus information in the system end in accordance with that in the application end. In the embodiments of the disclosure, by separating the input focus information of the system end and the input focus information of the application end, the purpose of forging the focus in the application end is achieved. In the embodiments of the present disclosure, while the notification for forging a focus is applied to the application to be preloaded to make the application to be preloaded have focus information, focus information of the system end is still correct. As such, the application to be preloaded can be drawn normally and hence be preloaded completely. The focus exists in the system end and the application end, which can be considered as existing in a server and a client. The system end records the application with the focus and the application end saves the flag to identify whether it has the focus. The input focus can be forged when a window system of Android® adds a window and needs to update the focus, and then the notification for forging a focus is generated and sent. The focus can be forged by calling the client end of the window to change the focus of the window, whereby the window obtains the focus. As an embodiment, the notification for forging a focus can be sent based on the Binder mechanism. The Binder mechanism is most commonly used for inter-process communication in Android® system, and adopts a c/s architecture, that is, a client/service architecture.

In the embodiments of the present disclosure, the preset time period can be set according to practical situations. For example, the preset period can be a fixed period after preloading is started, a period from start of preloading to completion of preloading, or the like. In some embodiments, duration of the preset period includes play duration of a launched advertisement or a launched animation of the application to be preloaded. During launching of some applications, some advertisements or animations may be played and last for three to more than ten seconds. The user may be unable to perform any operation during playing of the advertisements or animations but wait for completion of the playing, which wastes user's valuable time. According to the embodiments of the present disclosure, it is possible to complete the playing of the advertisements or animations beyond the screen before the application to be preloaded is launched, so that a homepage or other pages of the application operable with the user can be directly entered when the application to be preloaded is launched. In this way, a time point at which the application to be preloaded is operable can be further advanced, thereby reducing waiting time.

In the embodiments of the present disclosure, the method further includes the following after the application interfaces corresponding to the new application and the application to be preloaded are preloaded according to the pre-established active-window stack for preloading. In response to receiving an instruction indicative of launching a third application included in the new application and the application to be preloaded, an application interface corresponding to a target application included in the active-window stack for preloading is migrated to the display screen for display. As an embodiment, the target application included in the active-window stack for preloading can be implemented as a third target application. As such, when the third application needs to be launched, it is possible to directly migrate the application interface drawn to the display screen for display, which can realize quick switching of application interfaces and increase the launching speed.

In the embodiments of the present disclosure, the application interface corresponding to the third target application included in the pre-established active-window stack for preloading is migrated to the display screen for display as follows. A task stack corresponding to the third target application included in the pre-established active-window stack for preloading is migrated to the top of an application active-window stack. Size information, configuration information, and visibility of the task stack are updated, such that the application interface corresponding to the third target application can be displayed on the display screen. In this way, it is possible to ensure stability of migration process of the interface and avoid problems such as lag, black screen, low migration speed, or the like during recovery.

Figure 2:
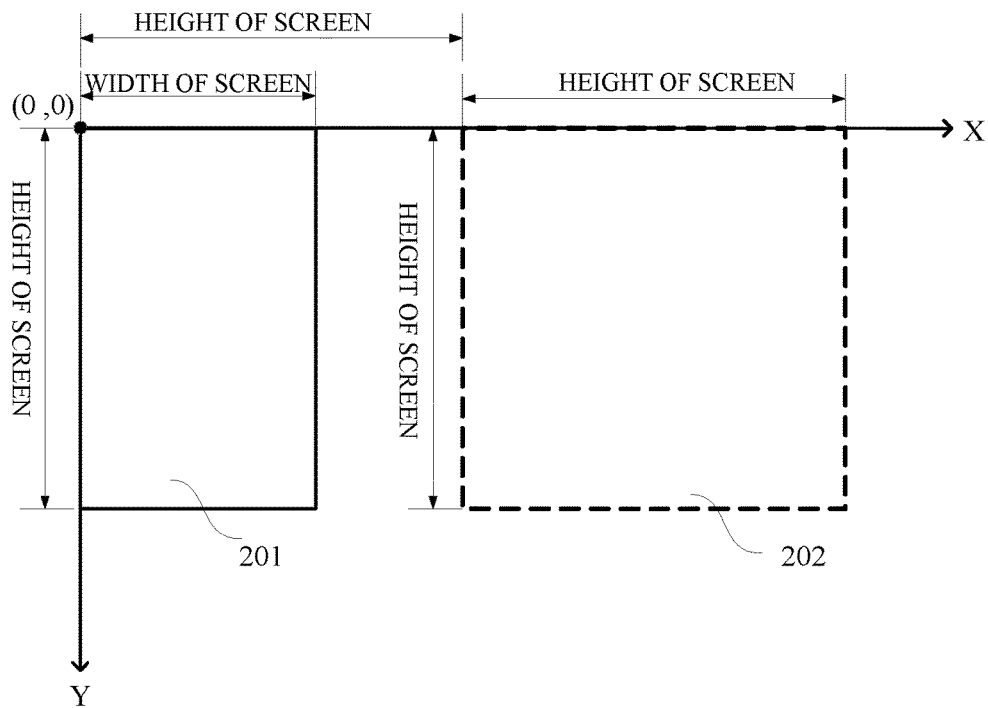
FIG. 2 is a diagram illustrating a relative positional relationship between an active-window stack for preloading and a display area of a display screen according to an aspect of the present disclosure.
Figure 3:
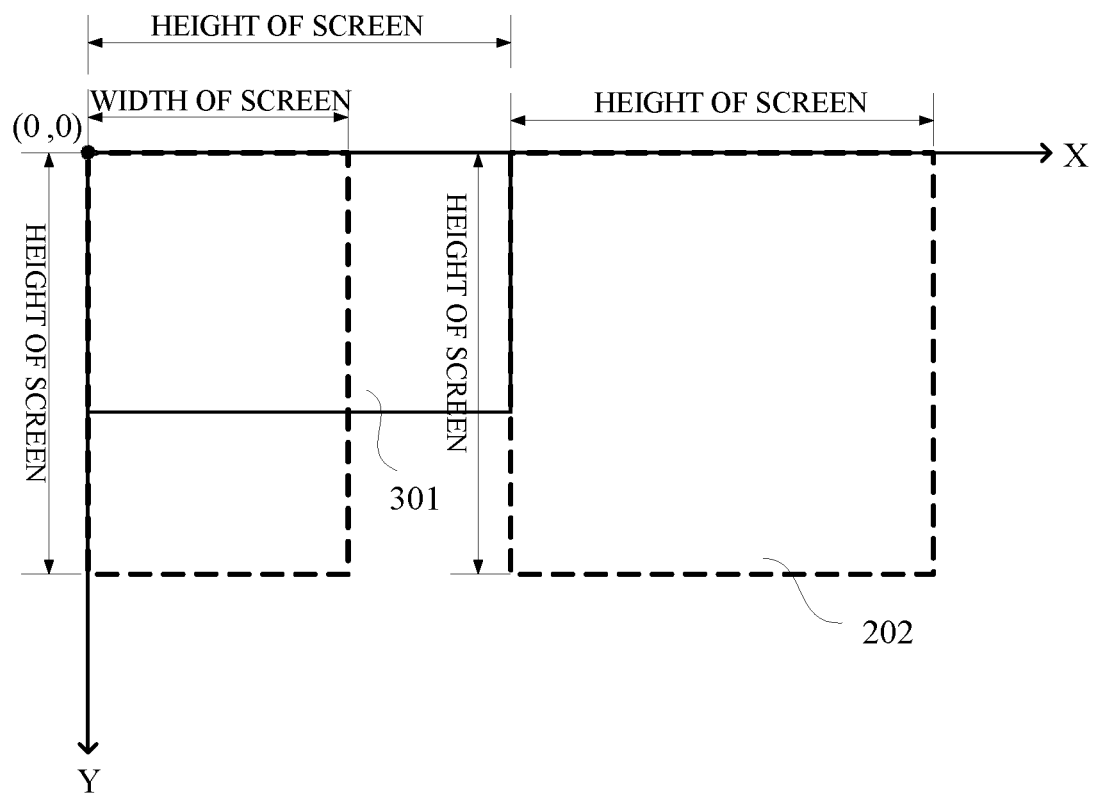
FIG. 3 is a diagram illustrating a relative positional relationship between an active-window stack for preloading and a display area of a display screen according to another aspect of the present disclosure.

For some terminals, particularly for mobile terminals such as mobile phones and tablet computers, display modes of the display screen usually include a landscape mode and a portrait mode for convenience of the user. While lots of applications are displayed in the portrait mode by default, some other applications are displayed in the landscape mode by default (such as some online games). When the terminal is in use, some applications can switch between the landscape mode and the portrait mode, as the user changes a direction of holding the terminal. In some embodiments, the boundary coordinates of the active-window stack for preloading are denoted as (H, 0, 2H, H), the coordinate system corresponding to the boundary coordinates is a system coordinate, the system coordinate has an origin located at an upper left corner of the display screen, and H denotes a length of a long side of a display area of the display screen, that is, a side corresponding to H is the longest side of the display area of the display screen, which is the height of the display screen in the portrait mode and the width of the display screen in the landscape mode. In this way, it is possible to take into consideration the landscape mode of the display screen, display of the application preloaded in the landscape mode, and normal display of some applications. FIG. 2 is a diagram illustrating a relative positional relationship between an active-window stack for preloading and a display area of a display screen according to an aspect of the present disclosure. As illustrated in FIG. 2, the display screen is in the portrait mode. The origin of the system coordinate of the terminal is located at a left vertex (0, 0) of the display screen 201. The width direction of the display screen 201 is defined as X-axis, and the height direction is defined as Y-axis. The boundary coordinates of the preloading Stack 202 are denoted as (H, 0, 2H, H), where H denotes the height of the screen, that is, an area within the solid rectangle on the left side is the display area of the display screen, and an area within the dotted rectangle on the right side is the preloading display area. FIG. 3 is a diagram illustrating a relative positional relationship between an active-window stack for preloading and a display area of a display screen according to another aspect of the present disclosure. As illustrated in FIG. 3, the display screen is in the landscape mode. The origin of the system coordinate of the terminal is located at a left vertex (0, 0) of the display screen 301. The height direction of the display screen 301 is defined as X-axis, and the width direction is the defined as Y-axis. The boundary coordinates of the preloading Stack 202 are denoted as (H, 0, 2H, H), where H denotes the height of the screen, that is, an area within the solid rectangle on the left side is the display region of the display screen, and an area within the dotted rectangle on the right side is the preloading display region.

The reasons for which boundaries of the preloading Stack are set as such are as follows.

A horizontal coordinate of the upper left corner is H, which is to prevent the display screen (also called the main screen) from displaying on the interface of the application to be preloaded when the display screen is in a landscape mode. Since the main screen can be in the landscape mode in addition to the portrait mode, in order to prevent the display area of the main screen from displaying part of the preloaded application when the main screen is in the landscape mode, the horizontal coordinate of the upper left corner of the rectangle area corresponding to the preloading Stack is set to be the height of the main screen.

A vertical coordinate of the upper left corner is 0, which is for the application to be preloaded to calculate correctly a height of a status bar. In order to better design a user interface (UI), the Android® application can customize a top status bar. If the vertical coordinate corresponding to an upper side is not equal to 0, the height of the status bar may be wrong.

A horizontal coordinate of the lower right corner is 2H (twice the height of the screen), that is, a width of a rectangle corresponding to the preloading Stack equals the height of the screen such that the size of the preloading Stack can include a size of a preloaded landscape application (that is, an application with an application interface in the landscape mode).

A vertical coordinate of the lower right corner is H, that is, a height of the rectangle corresponding to the preloading Stack equals the height of the screen so that the size of the preloading Stack can include a size of a preloaded portrait application (that is, an application with an application interface in the portrait mode).

For the reasons above, the size of the preloading Stack is set to be (H, 0, 2H, H).

Figure 4:
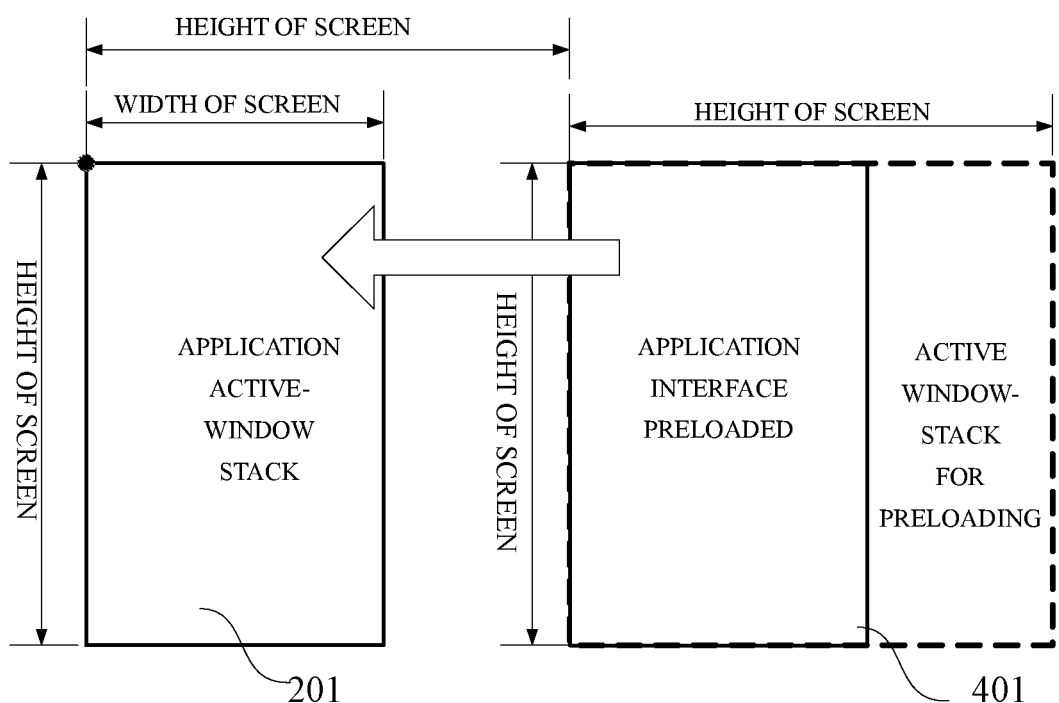
FIG. 4 is a diagram illustrating migration of an application interface according to an aspect of the present disclosure.

In addition, FIG. 4 is a diagram illustrating migration of an application interface according to an aspect of the present disclosure. As illustrated in FIG. 4, in response to receiving the instruction indicative of launching the third application, the application interface 401 corresponding to the third application included in the pre-established active-window stack for preloading is migrated to the display screen 201 for display. In this embodiment, a task to which the interface of the application to be preloaded belongs is migrated to a top of an application active-window stack, and size information, configuration information, and visibility of the task are updated, whereby the application interface can be displayed on the display screen normally.

Figure 5:
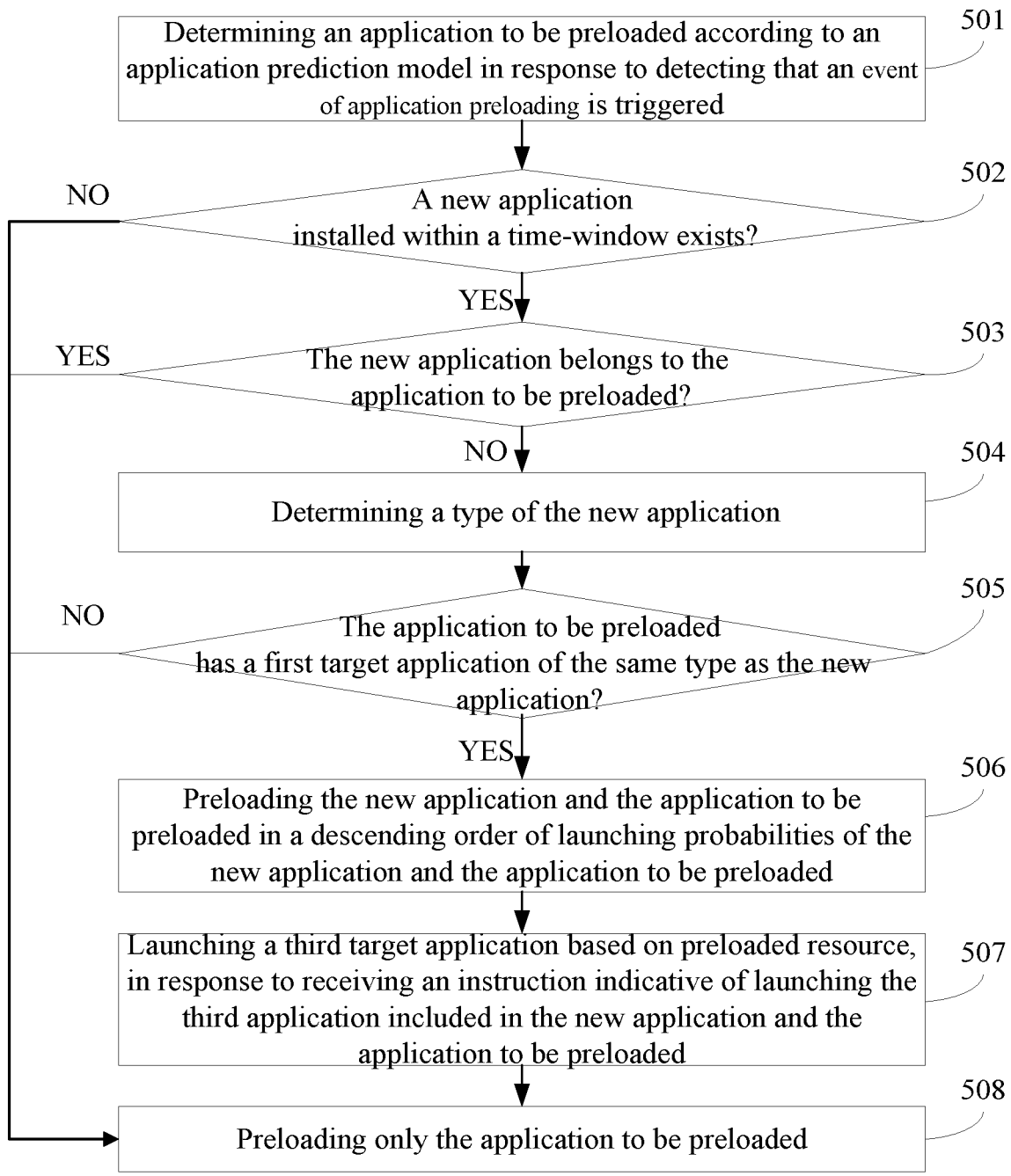
FIG. 5 is a flowchart illustrating a method for preloading an application according to another aspect of the present disclosure.

FIG. 5 is a flowchart illustrating a method for preloading an application according to another aspect of the present disclosure. The method includes the following.

At 501, an application to be preloaded is determined according to an application prediction model in response to detecting that an event of application preloading is triggered.

At 502, whether a new application installed within a time-window which has a preset length and is backtracked with a current moment as a starting moment exists is determined.

If so, proceed to operations at 503; otherwise, proceed to operations at 508.

As an embodiment, the current moment can be understood as the moment when the application to be preloaded is determined. The time-window which has the preset length and is backtracked with the current moment as the starting moment can be understood as a preset time period which is backtracked from the current moment. For example, the current moment is 12:00 on May 22, 2018, the preset length of the time-window is set to one day, and then determine whether the new application installed within a time period from 12:00 on May 22, 2018 to 12:00 on May 23, 2018 exists.

At 503, whether the new application belongs to the application to be preloaded is determined.

If so, proceed to operations at 508; otherwise, proceed to operations at 504.

At 504, a type of the new application is determined.

For example, the new application is Amap® and belongs to navigation applications.

At 505, whether the application to be preloaded has a first target application of the same type as the new application is determined. If so, proceed to operations at 506; otherwise, proceed to operations at 508.

As an embodiment, the application to be preloaded determined by operations at 501 includes Baidu® map, then it can be determined that the application to be preloaded has the first target application of the same type as Amap®.

At 506, the new application and the application to be preloaded are preloaded in a descending order of launching probabilities of the new application and the application to be preloaded.

A launching probability of the new application is the same as that of the first target application.

As an embodiment, the result of preloading the application to be preloaded in a descending order of launching probabilities is Application A, Application B, Application C, Application D, and Application E, then Application A, Application B, Application F (that is the new application of the same type as Application B), Application C, Application D, and Application E can be preloaded in the above sequence. Preloading order of Application B and Application F can be changed, or Application B and Application F can be preloaded simultaneously.

At 507, a third target application is launched based on preloaded resource, in response to receiving an instruction indicative of launching the third application included in the new application and the application to be preloaded.

As an embodiment, when a desktop icon corresponding to Application A is clicked, an instruction indicative of launching Application A is received, and Application A is launched based on preloaded resource, which can effectively increase the launching speed of Application A. As another embodiment, when a desktop icon corresponding to Application B is clicked, an instruction indicative of launching Application B is received, and Application B is launched based on preloaded resource, which can effectively increase the launching speed of Application B.

At 508, only the application to be preloaded is preloaded.

According to the method for preloading an application provided herein, when the application to be preloaded has the first target application of the same type as the new application, the new application and the applications to be preloaded are preloaded in a descending order of launching probabilities of the new application and the application to be preloaded. The launching probability of the new application is the same as that of the first target application. Whether to preload the new application can be reasonably determined according to the determination result of whether the application to be preloaded predicted has a target application of the same type as the new application, which can better suit the user's needs and can increase the launching speed of the application to be preloaded and the new application with high launching probabilities when selected by the user.

Figure 6:
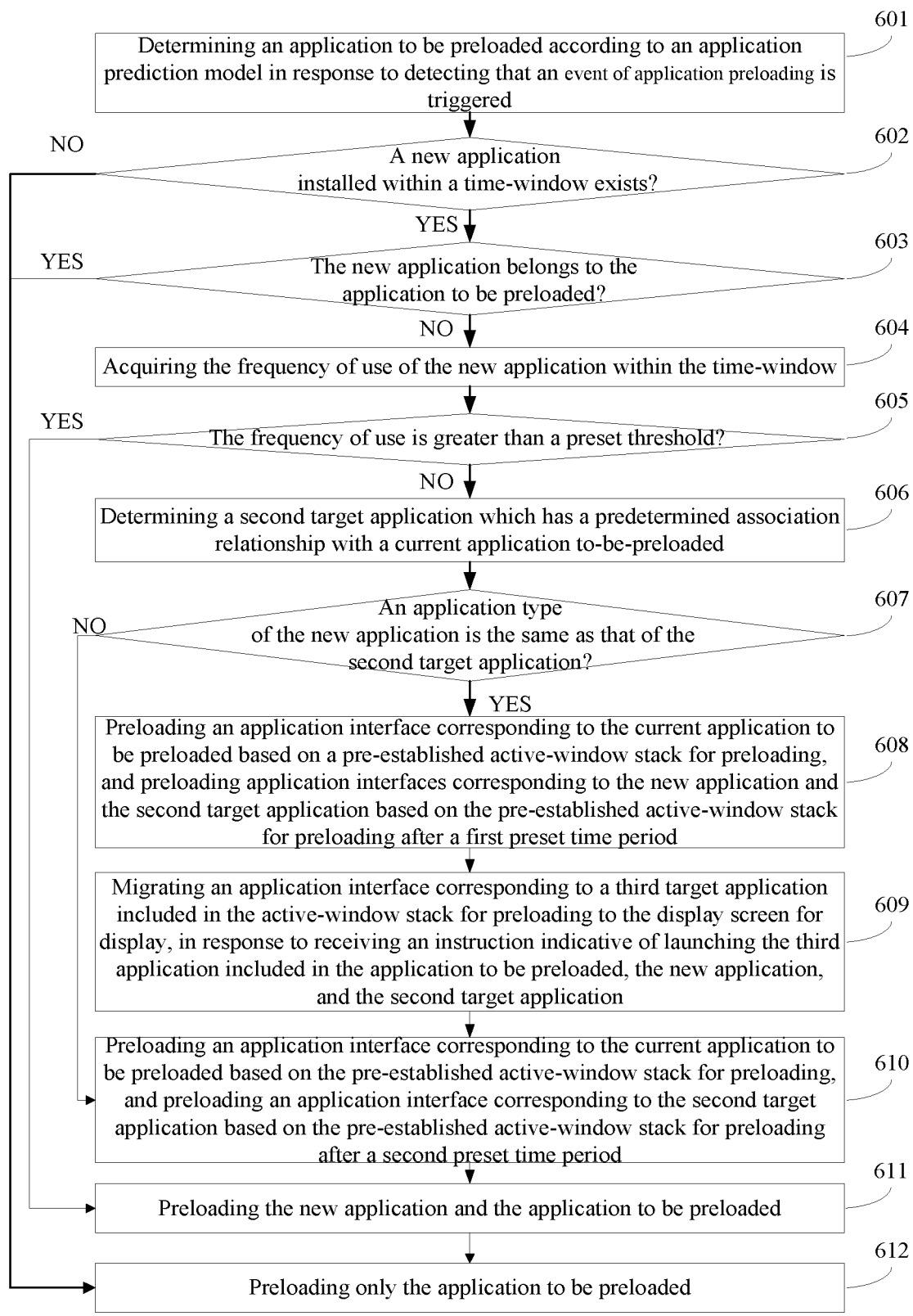
FIG. 6 is a flowchart illustrating a method for preloading an application according to yet another aspect of the present disclosure.

FIG. 6 is a flowchart illustrating a method for preloading an application according to yet another aspect of the present disclosure. The method includes the following.

At 601, application to be preloaded is determined according to an application prediction model in response to detecting that an event of application preloading is triggered.

At 602, whether a new application installed within a time-window which has a preset length and is backtracked with a current moment as a starting moment exists is determined. If so, proceed to operations at 603; otherwise, proceed to operations at 612.

At 603, whether the new application belongs to the application to be preloaded is determined. If so, proceed to operations at 612; otherwise, proceed to operations at 604.

At 604, the frequency of use of the new application within the time-window which has the preset length and is backtracked with the current moment as the starting moment is acquired.

At 605, whether the frequency of use is greater than a preset threshold is determined. If so, proceed to operations at 611; otherwise, proceed to operations at 606.

At 606, for each of the application to be preloaded, a second target application which has a predetermined association relationship with a current application to be preloaded is determined.

At 607, whether a type of the new application is the same as that of the second target application is determined. If so, proceed to operations at 608; otherwise, proceed to operations at 610.

At 608, an application interface corresponding to the current application to be preloaded is preloaded based on a pre-established active-window stack for preloading, and application interfaces corresponding to the new application and the second target application are preloaded based on the pre-established active-window stack for preloading after a first preset time period.

Boundary coordinates of the active-window stack for preloading are beyond a coordinate range of a display screen.

At 609, an application interface corresponding to a third target application included in the active-window stack for preloading is migrated to the display screen for display, in response to receiving an instruction indicative of launching the third application included in the application to be preloaded, the new application, and the second target application.

At 610, an application interface corresponding to the current application to be preloaded is preloaded based on the pre-established active-window stack for preloading, and an application interface corresponding to the second target application is preloaded based on the pre-established active-window stack for preloading after a second preset time period.

At 611, the new application and the application to be preloaded are preloaded.

At 612, only the application to be preloaded is preloaded.

According to the method for preloading an application herein, whether the frequency of use of the new application within the time-window which has the preset length and is backtracked with the current moment as the starting moment is greater than the preset threshold is determined. If so, preload the new application and the application to be preloaded; otherwise, the second target application which has a predetermined association relationship with the current application to be preloaded is determined for each of the application to be preloaded. When the type of the new application is the same as that of the second target application, the new application and the second target application are preloaded simultaneously with or after preloading of the current application to be preloaded. In this way, the hit rate of preloading an application that the user actually launches is improved, and the launching speeds of the new application and an application which has a predetermined association relationship with the current application to be preloaded are further increased.

Figure 7:
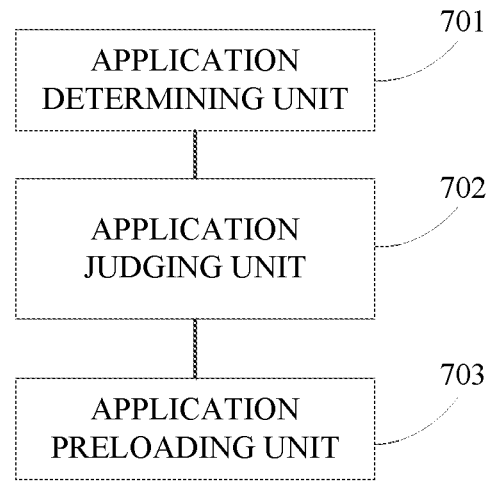
FIG. 7 is a block diagram illustrating an apparatus for preloading an application according to an aspect of the present disclosure.

FIG. 7 is a block diagram illustrating an apparatus for preloading an application according to an aspect of the present disclosure. The apparatus can be implemented with software and/or hardware and can be generally integrated in a terminal. The apparatus can preload an application to-be-launched by executing the method for preloading an application. As illustrated in FIG. 7, the apparatus includes an application determining unit 701, an application judging unit 702, and an application preloading unit 703.

The application determining unit 701 is configured to determine application to be preloaded in response to detecting that an event of application preloading is triggered.

The application judging unit 702 is configured to determine whether a new application installed within a time-window which has a preset length and is backtracked with a current moment as a starting moment belongs to the application to be preloaded, when the new application exists.

The application preloading unit 703 is configured to preload the new application and the application to be preloaded based on a determination that the new application does not belong to the application to be preloaded With aid of the apparatus for preloading an application provided in the embodiments of the present disclosure, the application to be preloaded are determined in response to detecting that the event of application preloading is triggered. When the new application installed within the time-window which has the preset length and is backtracked with the current moment as the starting moment exists, whether the new application belongs to the application to be preloaded is determined. the new application and the application to be preloaded are preloaded based on the determination that the new application does not belong to the application to be preloaded. By adopting technical solutions described above, the new application and the application to be preloaded are preloaded, which can improve the hit rate of preloading an application that the user actually launches, thereby increasing not only the launching speed of the application to be preloaded, but also the launching speed of the new application.

As an embodiment, the application preloading unit includes an type determining sub-unit and an application preloading sub-unit.

The type determining sub-unit is configured to determine a type of the new application based on the determination that the new application does not belong to the application to be preloaded.

The application preloading sub-unit is configured to preload the new application and the application to be preloaded when the application to be preloaded has a first target application of the same type as the new application.

As an embodiment, the application preloading sub-unit is configured to preload the new application and the application to be preloaded in a descending order of launching probabilities of the new application and the application to be preloaded, when the application to be preloaded has the first target application of the same type as the new application. A launching probability of the new application is the same as that of the first target application.

As an embodiment, the application preloading unit is configured to acquire the frequency of use of the new application within the time-window which has the preset length and is backtracked with the current moment as the starting moment based on the determination that the new application does not belong to the application to be preloaded, and configured to preload the new application and the application to be preloaded when the frequency of use is greater than a preset threshold.

As an embodiment, the application preloading unit is configured to, for each of the application to be preloaded, determine a second target application which has a predetermined association relationship with a current application to be preloaded based on the determination that the new application does not belong to the application to be preloaded, and configured to preload the new application and the second target application simultaneously with or after preloading of the current application to be preloaded, when an type of the new application is the same as that of the second target application.

As an embodiment, the application preloading unit is configured to preload application interfaces corresponding to the new application and the application to be preloaded respectively based on a pre-established active-window stack for preloading. Boundary coordinates of the active-window stack for preloading are beyond a coordinate range of a display screen.

As an embodiment, the apparatus for preloading an application further includes an application interface migrating unit.

The application interface migrating unit is configured to migrate an application interface corresponding to a third target application included in the active-window stack for preloading to the display screen for display, in response to receiving an instruction indicative of launching the third application included in the new application and the application to be preloaded.

In the embodiments of the present disclosure, the units or sub-units can refer an application-specific integrated circuit (ASIC), a processor, a memory configured to implement one or more software or hardware programs, an integrated logical circuit, and/or other devices that can provide above functions. In addition, the above units or sub-units can be implemented via the processor of terminal device illustrated in FIG. 8.

The embodiments of the disclosure also provide a computer-readable storage medium which includes computer executable instructions. The computer executable instructions are configured to execute a method for preloading an application when executed by a computer processor. The method includes the following.

An application to be preloaded is determined in response to detecting that an event of application preloading is triggered. When a new application installed within a time-window which has a preset length and is backtracked with a current moment as a starting moment exists, whether the new application belongs to the application to be preloaded is determined. the new application and the application to be preloaded are preloaded based on a determination that the new application does not belong to the application to be preloaded.

The storage medium refers to any of various types of memory devices or storage devices. The term "storage medium" is intended to include: a mounting medium such as a compact disc read-only memory (CD-ROM), a floppy disk, or a tape device; a computer system memory or a random access memory such as a dynamic random access memory (DRAM), a double data rate random access memory (DDRRAM), a static random access memory (SRAM), an extended data output random access memory (EDORAM) and a Rambus random access memory (Rambus RAM); a non-transitory memory such as a flash memory and a magnetic medium (such as a hard disk or an optical memory); a register and other similar types of memory elements, and the like. The storage medium can also include other types of memory or a combination thereof. In addition, the storage medium can be located in a first computer system in which a program is executed, or can be located in a second computer system coupled to the first computer system via a network, such as the Internet. The second computer system can provide program instructions to the first computer for execution. The term "storage medium" can include two or more storage media that can reside in different locations (e.g. different computer systems connected through a network). The storage medium can store program instructions which are, for example, implemented as computer programs and are executable by one or more processors.

The computer executable instructions included in the storage medium provided herein are not limited to executing the operations of preloading an application as described above, and can also execute relevant operations of the method for preloading an application according to any of the embodiments of the disclosure.

Figure 8:
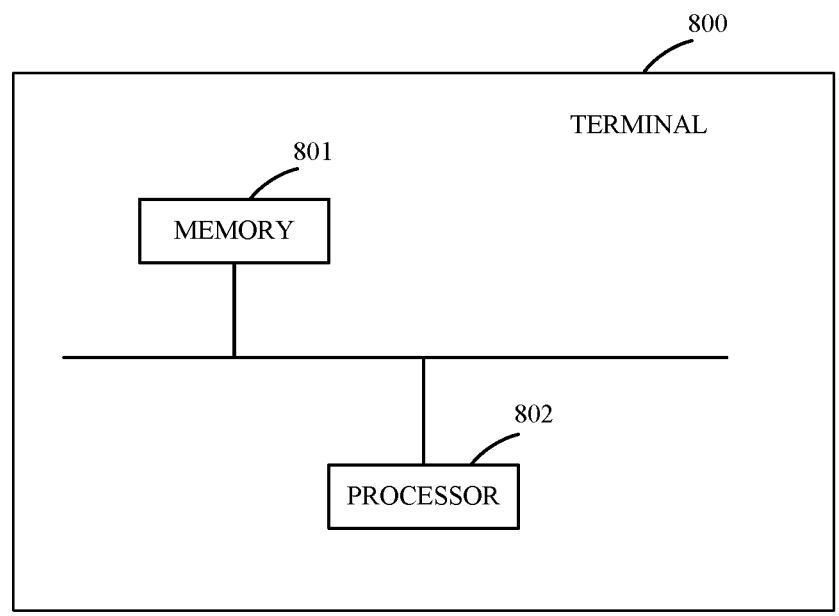
FIG. 8 is a block diagram illustrating a terminal according to an aspect of the present disclosure.

Embodiments of the disclosure provide a terminal, into which the apparatus for preloading an application provided herein can be integrated. FIG. 8 is a block diagram illustrating a terminal according to an embodiment of the disclosure. The terminal 800 includes a memory 801, a processor 802, and computer programs stored in the memory 801 and executed by the processor 802. The processor 802 is configured to execute the computer programs to execute the method for preloading an application of the embodiments of the disclosure.

According to the terminal provided herein, the new application and the application to be preloaded are preloaded, which can improve the hit rate of preloading an application that the user actually launches, thereby increasing not only the launching speed of the application to be preloaded, but also the launching speed of the new application.

Figure 9:
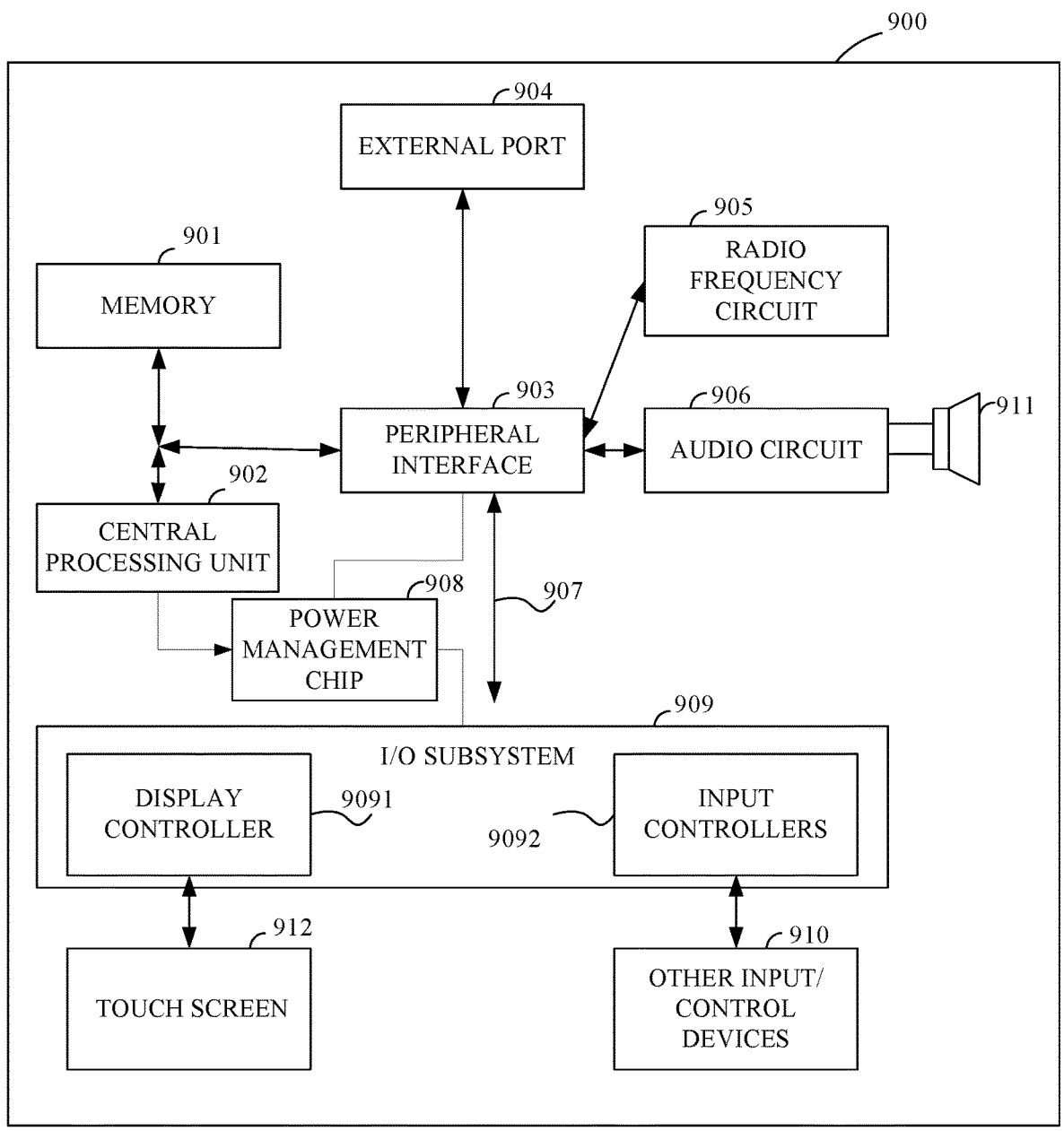
FIG. 9 is a block diagram illustrating a terminal according to another aspect of the present disclosure.

FIG. 9 is a block diagram illustrating another terminal according to an embodiment of the disclosure. The terminal includes a housing (not illustrated), a memory 901, and a central processing unit (CPU) 902 (also referred to as a processor, hereinafter CPU for short), a circuit board (not illustrated), and a power supply circuit (not illustrated). The circuit board is disposed inside a space defined by the housing. The CPU 902 and the memory 901 are disposed on the circuit board. The power supply circuit is configured to supply power to each circuit or component of the terminal. The memory 901 is configured to store executable program codes. The CPU 902 is configured to run a computer program corresponding to the executable program codes by reading the executable program codes stored in the memory 901 to carry out the following operations.

An application to be preloaded is determined in response to detecting that an event of application preloading is triggered. Whether a new application installed within a time-window which has a preset length and is backtracked with a current moment as a starting moment belongs to the application to be preloaded is determined, when the new application exists. the new application and the application to be preloaded are preloaded based on a determination that the new application does not belong to the application to be preloaded.

The terminal further includes a peripheral interface 903, a radio frequency (RF) circuit 905, an audio circuit 906, a speaker 911, a power management chip 908, an input/output (I/O) subsystem 909, other input/control devices 910, a touch screen 912, other input/control devices 910, and an external port 904, which communicate with each other via one or more communication buses or signal lines 907.

It should be understood that, the terminal 900 illustrated is just exemplary and the terminal 900 can have more or fewer components than those illustrated in FIG.9. For example, two or more components can be combined, or different component configurations can be adopted in the terminal. The various components illustrated in FIG. 9 can be implemented in hardware, software, or a combination thereof including one or more signal processing and/or application specific integrated circuits.

The following describes a mobile phone as an example of the terminal for preloading an application.

The memory 901 is accessible to the CPU 902, the peripheral interface 903, and so on. The memory 901 can include a high-speed random access memory and can further include a non-transitory memory such as one or more magnetic disk storage devices, flash memory devices, or other transitory solid-state memory devices.

The peripheral interface 903 is configured to connect the input and output peripherals of the device to the CPU 902 and the memory 901.

The I/O subsystem 909 is configured to connect the input and the output peripherals such as the touch screen 912 and other input/control devices 910 to the peripheral interface 903. The I/O subsystem 909 can include a display controller 9091 and one or more input controllers 9092 configured to control other input/control devices 910. The one or more input controllers 9092 are configured to receive electrical signals from or send electrical signals to other input/control devices 910, where other input/control devices 910 can include a physical button (a press button, a rocker button, etc.), a dial, a slide switch, a joystick, or a click wheel. It should be noted that the input controller 9092 can be coupled with any of a keyboard, an infrared port, a universal serial bus (USB) interface, and a pointing apparatus such as a mouse.

The touch screen 912 functions as an input interface and an output interface between a terminal and a user, and is configured to display a visual output to the user. The visual output can include graphics, text, icons, videos, and the like.

The display controller 9091 in the I/O subsystem 909 is configured to receive an electrical signal from or send an electrical signal to the touch screen 912. The touch screen 912 is configured to detect contact on the touch screen. The display controller 9091 is configured to convert the contact detected into an interaction with a user interface object displayed on the touch screen 912, that is, to realize human-computer interaction. The user interface object displayed on the touch screen 912 can be an icon of a running game, an icon indicating connection to corresponding networks, and the like. It should be noted that, the device can also include a light mouse, which is a touch-sensitive surface that does not display a visual output, or can be an extension of a touch-sensitive surface formed by the touch screen.

The RF circuit 905 is configured to establish communication between a mobile phone and a wireless network (i.e. network side), to transmit and receive data between the mobile phone and the wireless network, such as transmitting and receive short messages, emails, and the like. The RF circuit 905 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit 905 can include known circuits for performing these functions, including but not limited to an antenna system, an RF transceiver, one or more amplifiers, a tuner, one or more oscillators, a digital signal processor, a coder-decoder (CO-DEC) chipset, a subscriber identity module (SIM), and so on.

The audio circuit 906 is configured to receive audio data from the peripheral interface 903, to convert the audio data into an electrical signal, and to transmit the electrical signal to the speaker 911.

The speaker 911 is configured to restore the voice signal received by the mobile phone from the wireless network via the RF circuit 905 to sound and to play the sound to the user.

The power management chip 908 is configured for power supply and power management of the hardware connected to the CPU 902, the I/O subsystem 909, and the peripheral interfaces 903.

The apparatus for preloading an application, the storage medium, and the terminal of the above embodiments can execute the method for preloading an application of any of the above embodiments and have corresponding functional modules and advantages of executing the method. For technical details not described herein, reference can be made to the description of the method for preloading an application.

The above are only some embodiments of the present disclosure and the technical principles applied thereto. Those skilled in the art will appreciate that the present disclosure is not limited to the embodiments described herein, and that various changes, modifications, and substitutions can be made by those skilled in the art without departing from the scope of the disclosure. Therefore, while the disclosure has been described in connection with certain embodiments, it is to be understood that the disclosure is not to be limited to the disclosed embodiments but, on the contrary, is intended to cover various equivalent arrangements included within the scope of the disclosure. The scope of the disclosure is determined by the scope of the appended claims.

What is claimed is:

1. A method for preloading an application, comprising:
   determining an application to be preloaded in response to detecting that an event is triggered;
   when a new application installed within a time window that has a preset length and is backtracked with a current moment as a starting moment exists, determining whether the new application belongs to the application to be preloaded; and
   preloading the new application and the application to be preloaded based on a determination that the new application does not belong to the application to be preloaded, comprising
     preloading application interfaces corresponding to the new application and the application to be preloaded respectively based on a pre-established active-window stack for preloading, boundary coordinates of the active-window stack for preloading being beyond a coordinate range of a display screen.

2. The method of claim 1, further comprising:
   acquiring a type of the new application; and
   judging that the application to be preloaded has a target application of a same type as the new application.

3. The method of claim 2, further comprising:
   judging that a launching probability of the target application is greater than a preset probability threshold.

4. The method of claim 2, further comprising:
   ordering the new application and the application to be preloaded in a descending order of launching probabilities of the new application and the application to be preloaded, a launching probability of the new application being same as that of the target application.

5. The method of claim 1, further comprising:
   acquiring a frequency of use of the new application within the time-window; and
   judging that the frequency of use is greater than a preset threshold.

6. The method of claim 1, wherein preloading the new application and the applications to be preloaded comprises:
   determining a target application having a predetermined relationship with a current application to be preloaded, the current application to be preloaded belonging to the application to be preloaded; and
   preloading the new application and the target application simultaneously with preloading of the current application to be preloaded or after preloading of the current application to be preloaded, when a type of the new application is same as that of the target application.

7. The method of claim 1, wherein preloading the application interfaces corresponding to the new application and the application to be preloaded respectively comprises:
   establishing a target process corresponding to the new application and the application to be preloaded;
   establishing a task stack corresponding to the new application and the application to be preloaded in the pre-established active-window stack for preloading;
   launching an active-window corresponding to the new application and the application to be preloaded in the task stack according to the target process; and
   drawing and displaying the application interfaces corresponding to the new application and the application to be preloaded according to the active-window launched.

8. The method of claim 1, further comprising:
   migrating an application interface corresponding to a target application included in the pre-established active-window stack for preloading to the display screen for display, in response to receiving an instruction indicative of launching the target application included in the new application and the application to be preloaded.

9. The method of claim 8, wherein migrating the application interface corresponding to the target application included in the pre-established active-window stack for preloading to the display screen for display comprises:
   migrating a task stack corresponding to the target application to the top of an application active-window stack; and
   displaying the application interface corresponding to the target application on the display screen by updating size information, configuration information, and visibility of the task stack.

10. A terminal, comprising:
    at least one processor; and
    a computer readable storage, coupled to the at least one processor and storing at least one computer executable instruction thereon which, when executed by the at least one processor, cause the at least one processor to carry out actions, comprising:
      determining an application to be preloaded in response to detecting that an event is triggered;
      when a new application installed within a time window that has a preset length and is backtracked with a current moment as a starting moment exists, determining whether the new application belongs to the application to be preloaded; and preloading the new application and the application to be preloaded based on a determination that the new application does not belong to the application to be preloaded, comprising:

preloading application interfaces corresponding to the new application and the application to be preloaded respectively based on a pre-established active-window stack for preloading, boundary coordinates of the active-window stack for preloading being beyond a coordinate range of a display screen.

11. The terminal of claim 10, wherein the at least one processor is further caused to carry out actions, comprising:
acquiring a type of the new application; and
judging that the application to be preloaded has a target application of a same type as the new application.

12. The terminal of claim 11, wherein the at least one processor is further caused to carry out actions, comprising:
ordering the new application and the application to be preloaded in a descending order of launching probabilities of the new application and the application to be preloaded, a launching probability of the new application being same as that of the target application.

13. The terminal of claim 10, wherein the at least one processor is further caused to carry out actions, comprising:
acquiring a frequency of use of the new application within the time-window; and
judging that the frequency of use is greater than a preset threshold.

14. The terminal of claim 10, wherein the at least one processor carrying out the action of preloading the new application and the application to be preloaded based on the determination that the new application does not belong to the application to be preloaded is caused to carry out actions, comprising:
determining a target application having a predetermined relationship with a current application to be preloaded, the current application to be preloaded belonging to the application to be preloaded; and
preloading the new application and the target application simultaneously with preloading of the current application to be preloaded or after preloading of the current application to be preloaded, when a type of the new application is same as that of the target application.

15. The terminal of claim 10, wherein the at least one processor is further caused to carry out actions, comprising:
migrating an application interface corresponding to a target application included in the pre-established active-window stack for preloading to the display screen for display, in response to receiving an instruction indicative of launching the target application included in the new application and the application to be preloaded.

16. The terminal of claim 15, wherein the at least one processor carrying out the action of migrating the application interface corresponding to the target application included in the pre-established active-window stack for preloading to the display screen for display is caused to carry out actions, comprising:

migrating a task stack corresponding to the target application to the top of an application active-window stack; and
displaying the application interface corresponding to the target application on the display screen by updating size information, configuration information, and visibility of the task stack.

17. The terminal of claim 10, wherein the at least one processor carrying out the action of preloading the application interfaces corresponding to the new application and the application to be preloaded respectively is caused to carry out actions, comprising:
establishing a target process corresponding to the new application and the application to be preloaded;
establishing a task stack corresponding to the new application and the application to be preloaded in the pre-established active-window stack for preloading;
launching an active-window corresponding to the new application and the application to be preloaded in the task stack according to the target process; and
drawing and displaying the application interfaces corresponding to the new application and the application to be preloaded according to the active-window launched.

18. A non-transitory computer-readable storage medium storing a computer program which, when executed by a processor, causes the processor to carry out actions, comprising:
determining an application to be preloaded in response to detecting that an event is triggered;
when a new application installed within a time window that has a preset length and is backtracked with a current moment as a starting moment exists, determining whether the new application belongs to the application to be preloaded; and
preloading the new application and the application to be preloaded based on a determination that the new application does not belong to the application to be preloaded, comprising:
preloading application interfaces corresponding to the new application and the application to be preloaded respectively based on a pre-established active-window stack for preloading, boundary coordinates of the active-window stack for preloading being beyond a coordinate range of a display screen.

19. The non-transitory computer-readable storage medium of claim 18, wherein the computer program is further executed by the processor to carry out actions, comprising:
acquiring a type of the new application; and
judging that the application to be preloaded has a target application of a same type as the new application.

20. The non-transitory computer-readable storage medium of claim 18, wherein the computer program is further executed by the processor to carry out actions, comprising:
acquiring a frequency of use of the new application within the time-window; and
judging that the frequency of use is greater than a preset threshold.

* * * * *